May 21, 1963 D. L. NICOL 3,090,236
TEMPERATURE INDICATING DEVICES
Filed Oct. 2, 1961
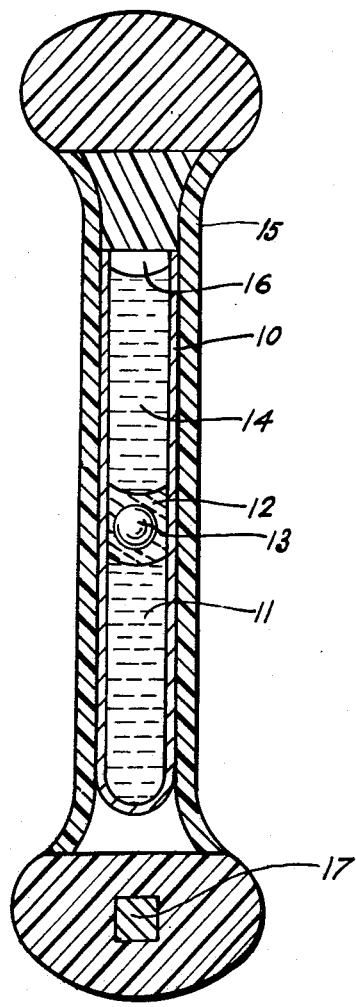

United States Patent Office 3,090,236
Patented May 21, 1963

3,090,236
TEMPERATURE INDICATING DEVICES
Donald Laurence Nicol, Hull, England, assignor to National Research Development Corporation, London, England., a British corporation
Filed Oct. 2, 1961, Ser. No. 142,042
Claims priority, application Great Britain Oct. 15, 1960
13 Claims. (Cl. 73—358)

This invention relates to temperature indicating devices.

According to the present invention, a temperature-indicating device, which will give a visual indication of its temperature having reached a given value and which will continue to give this indication even if its temperature subsequently falls below the given value, comprises a closed vessel of such composition (and wall thickness) that the colour of its contents may be seen, which is divided into separate compartments by a separator composed of a substance which melts at the temperature whose attainment is to be indicated, the separate compartments containing substances which are liquid at the temperature whose attainment is to be indicated and which upon mixing with each other in the event of the separator being melted will produce a substantially permanent coloration dissimilar from any coloration observable when the separator is intact, the substance of which the separator is composed being insoluble in and non-reactive with the liquids which it is to separate.

According to a further optional feature of this invention, said substances which are liquid at the temperature whose attainment is to be indicated are such that when they react they form a flocculent precipitate.

One advantage of this optional feature of the invention is that the large particles formed by the reaction of the two substances would ensure that any diffusion which occurs through the solid separator would not continue as the large solid particles would fill up any gaps in the separator and prevent further diffusion.

It is preferable that the liquids which produce the dissimilar coloration upon mixing should be aqueous solutions, and in this case the substance of which the separator is composed must be insoluble in water. It is also preferable (though not essential) that the density of the substance of which the separator is composed should be lower than that of water. If the device is intended for use at temperatures below the freezing point of water, then ethyl alcohol or ethylene glycol or some other suitable substance may be added to the aqueous solutions in a 50/50 mixture of alcohol or glycol and water just mentioned in order to ensure that they are still liquid at the temperatures in question; in this case the substance of which the separator is composed must be insoluble in aqueous alcohol or whatever mixture is used.

Hydrocarbons are particularly useful substances of which to form the separators, and the following are some specific examples with their melting points (i.e. the temperatures which they may be used to indicate):

| | ° F. |
|---|---|
| Tetralin (tetrahydronaphthalene) | −20 |
| o-Xylene | −17 |
| 1,2,3,5-tetramethylbenzene (isodurene) | −10 |
| Neopentane | −6 |
| 1.2.3 trimethyl benzene (hemimellitene) | +5 |
| n-Dodecane | +10 |
| Cycloheptane | +12 |
| n-Tridecane | +21 |
| Benzene | 42 |
| p-Xylene | 59 |
| Diphenyl-methane | 79 |

The invention is by no means restricted, however, to the use of hydrocarbon separators, and the following are some specific examples of other substances which may be used, with their melting points:

| | ° F. |
|---|---|
| Tertiary butyl chloride | −16 |
| Hexyl methyl ketone | −6 |
| 1-decanol acetate | +5 |
| Ethyl hexyl ketone | +17 |
| n-Nonanol (n-nonane-1-ol) | +23 |

The substances contained in the separate compartments may for example be a nickel sulphate or other nickel salt solution on the one hand and a dimethylglyoxime solution on the other hand; nickel sulphate solution is pale green and dimethylglyoxime solution is colourless, but upon being mixed the solutions give a red coloration. Another example of a pair of substances which may be present in the separate compartments is provided by lead acetate and potassium iodide solutions; in this case a yellow coloration is formed when the solutions mix, both solutions being colourless so long as they remain unmixed.

The following are preferred pairs of solutions which can be used as said substances and which react to form a flocculent precipitate:

| Temp. | Colour | Solutions | Separator |
|---|---|---|---|
| −6° F | Blue | 1% cobaltnitrate<br>0.5% sodium hydroxide<br>0.5% sodium carbonate | Methyl hexyl ketone. |
| +5° F | Green | 1% copper sulphate<br>0.5% benzoin-α-oxime | 1 decanol acetate. |
| +10° F | Red | 1% nickel sulphate<br>0.5% dimethylglyoxime | n-dodecane. |
| +23° F | Yellow | 1% lead acetate<br>1% potassium iodide | 1-nonanol. |

It should be noted that the use of sodium carbonate with sodium hydroxide is advantageous in that whereas sodium hydroxide mixed with cobalt nitrate normally gives a blue precipitate which turns brown in a matter of hours, if sodium carbonate is present it remains blue for very long periods.

The vessel itself may for instance be a closed tube of polyethylene, a plasticised polyvinyl chloride composition, or another synthetic resin or synthetic resin composition.

A preferred form of tube is one made of plasticised P.V.C. As the separator does not adhere well to P.V.C., the tube preferably contains a glass lining.

Advantages of using P.V.C. are that it gives a high degree of transparency and it is easy to seal.

A further advantage of the P.V.C. tube is that there is little or no loss of liquid should the inner glass lining be smashed. Consequently, the temperature indicator can be used close to food without any risk of contamination.

Preferably the lower end of the tube includes a coloured comparator area such as a spot to indicate the change in colour which will occur when the temperature is reached and the two substances react.

To ensure that the solutions on either side of the separator mix when the separator melts a solid object such as a ball bearing, or a small glass ball for example, is frozen into the separator. In use the tube is laid horizontally. With this preferred feature the ball moves on melting of the separator and ensures adequate mixing.

One embodiment of the invention is diagrammatically illustrated in the accompanying drawing, which shows a temperature indicator in accordance with the invention comprising a 1 ml. capacity glass tube 10 of the type known as a Durham tube as used by bacteriologists which is filled to just below the halfway mark with an aqueous solution 11 of, say, lead acetate. A non-aqueous layer 12 of, say, 1-nonanol containing a ball bearing 13 is solidified on top of the solution of lead acetate so as to be about halfway along the tube 10. A second aqueous solution 14 of, say, potassium iodide is then put into the top half of the tube on top of the non-aqueous separator layer.

The glass tube is then inserted as a liner in a plasticised P.V.C. tube 15 and both ends of the P.V.C. tube are sealed leaving a small air gap 16. At one end of the P.V.C. tube a coloured insert 17 of the type of material used for P.V.C. covered electric cables is moulded into the sealing portion at the end of the P.V.C. tube, said insert being of the same colour as the colour occurring when the solutions mix.

The whole assembly is about 3½" to 4" long and the actual P.V.C. covered central area containing the glass tube is about ½" to ¾" diameter.

In use the temperature indicator is positioned horizontally in, say, a crate of frozen food.

If the frozen food is raised above a predetermined temperature at any time the separator layer melts, the two aqueous solutions mix aided by the air bubble and ball bearing and the contents of the tube, instead of being clear and colourless, become yellow and opaque. This provides a permanent indication that the tube, at some time, has been subjected to a higher temperature than the predetermined temperature.

Another specific form of temperature-indicating device in accordance with the invention which may be used for such an application comprises a polyethylene tube about 3" long and about 0.25" internal diameter, divided into two compartments by a layer of frozen n-dodecane, one compartment being filled with a 1% solution of nickel sulphate in a mixture of water and alcohol in equal parts, and the other compartment being filled with a 0.5% solution of dimethyl-glyoxime in a similar water-alcohol mixture. Such a device may be made by taking a tube sealed at one end, filling it to a depth of about 1% with the nickel sulphate solution, adding n-dodecane to form a layer about 0.25" deep, placing the tube in a freezing bath or cold store until the n-dodecane (which has a melting point of +12° F.) is frozen, adding the dimethyglyoxime solution on top of the frozen n-dodecane, and sealing up the tube. The technique just described may be used in making other devices in accordance with the invention if the substance of which the separator is composed has a lower specific gravity than at least one of the two substances in liquid form which it is to separate, and if both of these have a specific gravity lower than the separator substance in liquid form the technique may be modified by freezing the first liquid to be introduced before forming the separator layer. In any case, however, it will be understood that when the device has been prepared it should naturally be stored at a temperature lower than the melting point of the separator substance.

A temperature-indicating device in accordance with the present invention may if desired be arranged to indicate more than one temperature. In this case a number of separators with different melting points may be used, the various melting points corresponding, as implied by the preceding description, with the various temperatures to be indicated. Thus there may for instance be three separators of progressively increasing melting points arranged in an equally-spaced series along the length of a tubular closed vessel, with nickel sulphate solution in the outermost compartment next to the lowest-melting separator and dimethylglyoxime solution in each of the other three compartments; the attainment of the lowest, intermediate and highest temperatures by such a device will be shown by the appearance of a red-coloration along half, three-quarters or the whole of the length of the tube respectively.

I claim:

1. A temperature indicating device which will give a visual indication of its temperature having reached a given value and which will continue to give this indication even if its temperature subsequently falls below the given value, comprising a closed vessel of such composition and wall thickness that the colour of its contents may be seen, which is divided into separate compartments by a separator composed of a substance which melts at the temperature whose attainment is to be indicated, the separate compartments containing substances which are liquid at the temperature whose attainment is to be indicated and which upon mixing with each other in the event of the separator being melted will produce a substantially permanent coloration dissimilar from any coloration observable when the separator is intact, the substance of which the separator is composed being insoluble in and non-reactive with the liquids which it is to separate.

2. A temperature indicating device according to claim 1 in which the said substances which are liquid at the temperature whose attainment is to be indicated are such that when they react they form a flocculent precipitate.

3. A temperature indicating device according to claim 1 in which the liquids which produce the dissimilar coloration upon mixing are aqueous solutions and the substance of which the separator is composed is insoluble in water.

4. A temperature indicating device according to claim 3 in which the density of the substance of which the separator is composed is lower than that of water.

5. A temperature indicating device according to claim 3 in which a freezing-point depressant is added to the aqueous solutions.

6. A temperature indicating device comprising a vessel having a transpicuous wall, at least one separator dividing said vessel into separate compartments, said separator being composed of a substance which melts at a temperature required to be indicated, and liquids in said compartments which upon mixing change in appearance.

7. A temperature indicating device according to claim 6 in which the separator is composed of a hydrocarbon.

8. A temperature indicating device according to claim 6 in which the liquids are such that upon mixing they produce a coloration different from any coloration of the unmixed liquids and a comparator is carried by the device of the same colour as that produced by mixing the liquids.

9. A temperature indicating device according to claim 6 in which said vessel comprises a closed tube of a synthetic resin composition.

10. A temperature indicating device according to claim 9 in which said tube has a glass lining.

11. A temperature indicating device comprising a vessel having a transpicuous wall, at least one separator dividing the vessel into separate compartments, said separator being composed of a substance which melts at a temperature required to be indicated, and liquids in said compartments which upon mixing produce a distinctive color and a flocculent precipitate.

12. A temperature indicating device comprising a vessel having a transpicuous wall, at least one separator dividing the vessel into separate compartments, said separator being composed of a substance which melts at a temperature required to be indicated, liquids in said compartments which upon mixing change in appearance, and a solid object in said separator displaceable when the separator melts.

13. A temperature indicating device according to claim 12 in which said solid object is a ball.

References Cited in the file of this patent

UNITED STATES PATENTS

| | | |
|---|---|---|
| 2,662,018 | Smith | Dec. 8, 1953 |
| 2,677,278 | Smith et al. | May 4, 1954 |
| 2,856,885 | Huyck et al. | Oct. 21, 1958 |
| 2,856,930 | Huyck et al. | Oct. 21, 1958 |